April 14, 1931.   L. S. HARBER ET AL   1,801,043
VARIABLE SPEED DRIVING OR TRANSMITTING MECHANISM
Filed Dec. 5 1928
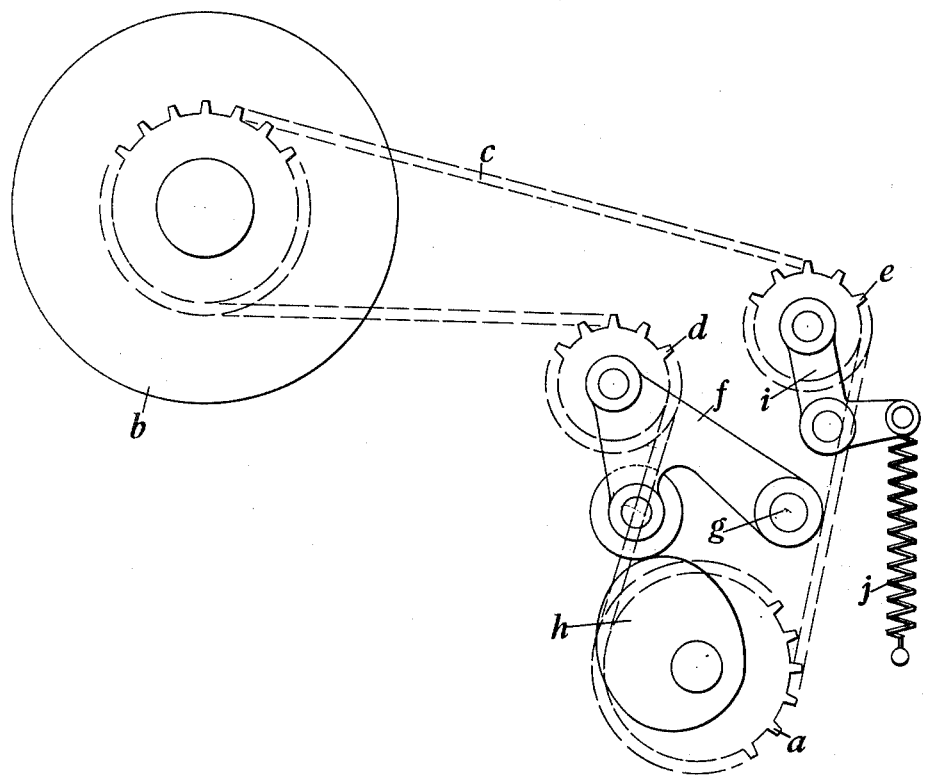
INVENTORS
LAURENCE SEYMOUR HARBER
JOHN EDWARD POINTON
BY
ATTORNEY Patented Apr. 14, 1931

1,801,043

UNITED STATES PATENT OFFICE

LAURENCE SEYMOUR HARBER AND JOHN EDWARD POINTON, OF PETERBOROUGH, ENGLAND, ASSIGNORS TO BAKER PERKINS COMPANY INCORPORATED, OF NEW YORK, N. Y.

VARIABLE-SPEED DRIVING OR TRANSMITTING MECHANISM

Application filed December 5, 1928, Serial No. 323,966, and in Great Britain May 26, 1928.

This invention relates to variable speed driving or transmitting mechanism for various purposes, and has for its object to provide simple and convenient means whereby with a driving element continuously running at a constant or uniform speed, the speed of the driven element may be periodically retarded or increased.

The invention comprises the combination with driving and driven elements connected by a continuous chain or other flexible transmitter, of means whereby the length of either side of the transmitter lying between the driving and driven elements can be varied to automatically cause their periodically repeated retraction or increase of rotating speed relatively to each other.

In particular the invention comprises the combination with a chain or other flexible transmitter, of a cam operated pulley acting on one side of the transmitter, and a following device acting on the other side of the transmitter.

The accompanying diagram illustrates one manner of carrying the invention into effect.

The driving and driven elements $a$, $b$ respectively comprise sprocket wheels adapted to engage an endless chain $c$ forming the transmitting element. The said chain is longer than is required to form an ordinary driving connection between the said wheels but it is kept sufficiently taut to function as a transmitter by means of jockey pulleys $d$, $e$. One of such jockey pulleys ($d$) is mounted on a lever $f$ which is rocked about its pivot $g$ by the action of a rotating cam $h$ or its equivalent, the arrangement being such that at and for the desired period of arrest or retardation of the movement of the driven sprocket wheel the tension is taken off the chain, or the portion of the chain lying between $a$ and $b$ is allowed to shorten, and the movement of the driving sprocket wheel $a$ is then entirely or in part spent in drawing in or taking up the slack in the chain. On the other hand, while, by the action of the cam, the said portion of the chain is lengthened, the motion of the driven member is correspondingly increased.

The other jockey pulley $e$ which acts as a following device, is mounted on a bell crank or other lever $i$ with which is arranged a spring $j$ or weight so that the other part of the chain follows automatically the alternating chain shortening and lengthening action set up by the cam operated lever.

The driving and driven elements and also the transmitter and its jockey pulleys or the like may take various forms and be arranged in any suitable manner to meet varying services or requirements.

Having thus described our invention what we claim as new and desire to secure by Letters Patent is:

In combination, a driving wheel, a driven wheel, a band around said wheels presenting two runs of greater length than the distance between said wheels, a cam rotatable with one of said wheels, an arm pivoted to a fixed support, an idler wheel thereon contacting a run of said belt, said arm also carrying a member co-operatively engaging said cam, a second arm pivoted to a fixed support, an idler wheel thereon, said arm yieldingly pressed against the other run of said belt, for the purposes set forth.

In testimony whereof we have signed our names to this specification.

LAURENCE SEYMOUR HARBER.
JOHN EDWARD POINTON.